(12) United States Patent
Carnevali (10) Patent No.: US 7,374,142 B2
(45) Date of Patent: May 20, 2008

(54) MAGNETIC MOUNTING APPARATUS

(76) Inventor: Jeffrey D. Carnevali, 5957 Beach Dr. SW., Seattle, WA (US) 98136

( * ) Notice: Subject to any disclaimer, the term of this patent is extended or adjusted under 35 U.S.C. 154(b) by 108 days.

(21) Appl. No.: 10/883,309

(22) Filed: Jun. 30, 2004

(65) Prior Publication Data

US 2004/0232291 A1  Nov. 25, 2004

(51) Int. Cl.
  *A47G 1/17*  (2006.01)
(52) U.S. Cl. .................. 248/206.5; 224/183; 379/446; 248/683
(58) Field of Classification Search .......... 248/206.5, 248/683, 467, 309.4, 205.1; 224/183, 562; 379/446, 454, 455
See application file for complete search history.

(56) References Cited

U.S. PATENT DOCUMENTS

| 2,414,653 | A |   | 1/1947  | Lookholder |
|-----------|---|---|---------|------------|
| 4,319,097 | A |   | 3/1982  | Liautaud |
| 5,025,966 | A |   | 6/1991  | Potter |
| 5,187,744 | A |   | 2/1993  | Richter |
| 5,213,240 | A |   | 5/1993  | Dietz et al. |
| 5,221,006 | A |   | 6/1993  | Plumlee et al. |
| 5,687,945 | A |   | 11/1997 | Lee |
| 5,836,049 | A | * | 11/1998 | Chiang ......................... 16/82 |
| 5,992,807 | A |   | 11/1999 | Tarulli |
| 6,076,790 | A |   | 6/2000  | Richter |
| 6,135,408 | A |   | 10/2000 | Richter |
| 6,149,116 | A |   | 11/2000 | Won |
| 6,293,509 | B1 |  | 9/2001  | Richter |
| 6,502,727 | B1 | * | 1/2003  | Decoteau .................... 224/162 |
| 6,553,626 | B2 |  | 4/2003  | Coburn |
| 6,739,567 | B1 |  | 5/2004  | Curtis |
| 2002/0003874 | A1 |  | 1/2002 | Peiker |

* cited by examiner

*Primary Examiner*—Kimberly T. Wood
(74) *Attorney, Agent, or Firm*—Charles J. Rupnick Attorney at Law (57) ABSTRACT

An apparatus for removably retaining by magnetic attraction any of various modern handheld devices. The magnetic mounting apparatus provides a magnetic mounting platform having a socket-like recessed support surface surrounded by a raised lip and backed by an interface structure that secures the magnetic mounting platform assembly to an external mounting surface. A permanent magnet is disposed within a cavity that positions magnet in close proximity to the flat support surface. A separate and distinct ferromagnetic adapter plate is adhered to a device to be supported, the adapter plate being structured for accommodation by the socket-like recessed support surface for removably retaining the device by magnetic attraction to the magnetic mounting platform.

16 Claims, 4 Drawing Sheets

MAGNETIC MOUNTING APPARATUS

This application is related to and claims priority benefit of co-pending U.S. patent application Ser. No. 10/402,064 entitled, "MAGNETIC MOUNTING PLATFORM," filed in the name of Jeffrey D. Carnevali on Mar. 27, 2003, the complete disclosure of which is incorporated herein by reference.

FIELD OF THE INVENTION

The present invention relates to the field of device mounting platforms, and in particular to handheld device mounting platforms operable by means of magnetic attraction.

BACKGROUND OF THE INVENTION

Mounting platforms for handheld devices and other small articles operable by means of magnetic attraction are generally well-known. Several of these magnetic mounting platforms are known for supporting handheld cell phones on the dashboard of an automobile. One example is shown in U.S. Pat. No. 5,992,807 entitled, UNIVERSAL MAGNETIC STAND FOR CELL PHONES, issued to Tarulli on Nov. 30, 1999, which is incorporated herein by reference, which describes a magnet that is permanently secured to the dashboard using a tape of strong bi-adhesive material. Attraction between the magnet and metal parts normally found in the cell phone cause the cell phone to be removably retained on the dashboard so that it may be lifted off manually and manually replaced on the magnet. A rubber layer is provided on the magnet's front face as frictional resistance to prevent the cell phone from slipping.

In another example, U.S. Pat. No. 6,135,408 entitled, MOBILE TELEPHONE HOLDER, issued to Richter on Oct. 24, 2000, which is incorporated herein by reference, describes a holder for a mobile telephone having a housing with a permanent magnet disposed adjacent to a front wall of the holder, with a iron plate between the magnet and a rear wall of the holder for increasing the magnetic forces generated by the magnet by providing a path for the magnetic force lines. The rear wall of the housing includes a number of engagement openings that act as mounting structure for mounting the holder on a vehicle dashboard. The front wall of the holder is structured with a recess opposite the magnet. An iron plate shaped to fit into the recess is adhesively attached to the mobile phone, and the mobile phone is thereby removably retained on the dashboard by the magnetic holder.

U.S. Pat. No. 6,149,116 entitled, HOLDER FOR MOBILE TELEPHONE, issued to Won on Nov. 21, 2000, which is incorporated herein by reference, describes still another mobile telephone holder having a magnet and a piece of iron attachable to the back of the mobile telephone and attachable to the magnet by magnetic force. A pair of independently moveable hinge-connected supports provide an angle-controllable attachment supporting means for attaching the main body of the holder to the surface of a vehicle dashboard.

These and other known magnetic mounting platforms each suffer limitations that limit their usefulness as mounting platforms for handheld devices in modem automobiles and other modem vehicles.

SUMMARY OF THE INVENTION

An apparatus for removably retaining by means of magnetic attraction any of various modem handheld devices, including but not limited to: cellular phones, GPS (global position system) receivers, two-way radios, pager/messaging devices, Personal Digital Accessories (PDAs) and other handheld or "mobile" electronic devices. The apparatus of the present invention overcomes limitations of the prior art by providing a magnetic mounting platform having a socket-like support surface that is recessed relative to a raised surrounding frame or lip portion and backed by an interface structure, the interface structure also operating as means for securing the magnetic mounting platform assembly to an external mounting surface. A permanent magnet is disposed within a cavity that positions magnet in close proximity to the flat support surface. According to one embodiment of the invention, the interface structure also operates as means for capturing and securing the magnet between the pad and the mounting surface.

Accordingly, the present invention provides a magnetic mounting apparatus formed of two distinct and separate parts: a rigid magnetic mounting platform formed of substantially rigid material, such as metal or hard plastic, and a cooperating ferromagnetic adapter plate. The magnetic mounting platform is provided, by example and without limitation, as having an operational surface formed with a peripheral lip portion substantially surrounding a socket, the socket having a support surface recessed relative to the raised lip portion and an transition surface between the support surface and the peripheral lip portion. The transition surface is optionally outwardly inclined between the support surface and the peripheral lip portion. An interface surface is spaced away from the operational surface, and a magnet retention structure is formed on an opposite surface from the recessed support surface. A permanent magnet of the rare-earth type is retained within the magnet retention structure. The adapter plate is formed of a plate of magnetically permeable material that is sized and structured to cooperate with the socket, and is structured with means for attaching the adapter plate to any pre-existing electronic or other handheld device intended to be removably retained by magnetic attraction to the magnetic mounting apparatus of the invention. According to one aspect of the invention, the means for attaching the adapter plate is an adhesive is disposed on one surface of the plate for adhering the adapter plate to the pre-existing device. According to another aspect of the invention, the means for attaching the adapter plate is one or more fastener clearance holes formed through the adapter plate and sized to accept a mechanical fastener.

The adapter plate cooperates with the transition between the support surface and surrounding frame or lip of the magnetic mounting platform to: during assembly, guide the adapter plate into the socket with its substantially flat mounting surface coextensive with and flush against the recessed support surface; and during disassembly, to release the adapter plate from the attractive grip of the magnet when relative twisting of the adapter plate causes the edges of the adapter plate to travel along the transition between the support surface and surrounding frame or lip of the magnetic mounting platform. Accordingly, the adapter plate is forcibly spaced away from the magnetic mounting platform support surface sufficiently far enough to significantly reduce the magnetic attraction between the adapter plate and the magnet or magnets secured on the other side of the mounting platform support surface, and the device is released from the mounting platform.

According to one aspect of the invention, the transition between the support surface and surrounding frame or lip of the magnetic mounting platform is inclined such that travel of the adapter plate relative to the mounting platform support surface is made easier.

According to another aspect of the invention, the magnet retention structure is embodied as a cavity that is sized to retain the magnet by radial compression. Accordingly, the cavity portion of the magnet retention structure is embodied as an annular ring sized to accept the magnet under at least a light pressure.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements.

The present invention is a magnetic mounting apparatus for removably retaining different handheld devices by means of magnetic attraction. The magnetic mounting apparatus of the invention being formed of a magnetic mounting platform in combination with a magnetically permeable adapter plate. The magnetic mounting platform of the invention provides a shallow socket of a generally rectangular or specifically square configuration having at its base a substantially flat support surface that is recessed relative to a substantially flat surrounding frame or lip with a transition wall between the support surface and surrounding frame or lip. According to one embodiment of the invention, the transition wall is optionally outwardly inclined between the support surface and surrounding frame or lip. The lip and recessed support surface are backed by a rigidly reinforcing interface structure that also operates as means for securing the magnetic mounting platform assembly to an external mounting surface. One or more permanent magnets are disposed within a cavity that positions the magnets in close proximity to the flat support surface in a centrally located position, with the support surface being reduced to a thin membrane adjacent to the location of each magnet. According to one embodiment of the invention, the interface structure also operates as means for capturing and securing the magnet between the support surface and the external mounting surface.

The adapter plate of the magnetic mounting apparatus of the invention is formed of a highly magnetically permeable ferromagnetic material, such as iron or nickel, that is backed with a bi-adhesive backing material. The adapter plate is a thin sheet or plate of a rectangular or square shape sized to fit snuggly within the socket of the magnetic mounting platform against the recessed support surface, the adapter plate having substantially flat opposing mounting and backing surfaces with the a bi-adhesive backing material distributed across the backing surface for adhering the adapter plate to a device to be supported by magnetic attraction to the apparatus of the invention.

During assembly, the adapter plate is guided by the transition wall between the support surface and surrounding lip into the socket with its substantially flat mounting surface coextensive with and flush against the substantially flat recessed support surface. During disassembly, the adapter plate is released from the attractive grip of the magnet by twisting it relative to the magnetic mounting platform. Interference between the edges of the adapter plate and the transition wall between the support surface and surrounding lip of the magnetic mounting platform forcibly space the adapter plate away from the magnetic mounting platform support surface sufficiently far enough to significantly reduce the attraction between the adapter plate and the one or more magnets secured on the other side of the mounting platform support surface, and the device is released from the mounting platform.

The adapter plate is optionally structured with unidirectionally rounded or beveled edges inclined outwardly away from the mounting surface toward the opposing backing surface. When present, the outwardly inclined edges cooperate with the optionally inclined transition walls between the support surface and surrounding frame or lip of the magnetic mounting platform to: during assembly, guide the adapter plate into the socket with its substantially flat mounting surface coextensive with and flush against the substantially flat recessed support surface; and during disassembly, to release the adapter plate from the attractive grip of the magnet by permitting the outwardly inclined edges of the adapter plate to travel along the cooperating inclined transition between the support surface and surrounding frame or lip of the magnetic mounting platform, whereby the adapter plate is forcibly spaced away from the magnetic mounting platform support surface sufficiently far enough to significantly reduce the attraction between the adapter plate and the one or more magnets secured on the other side of the mounting platform support surface and the device is released from the mounting platform.

Figure 1:
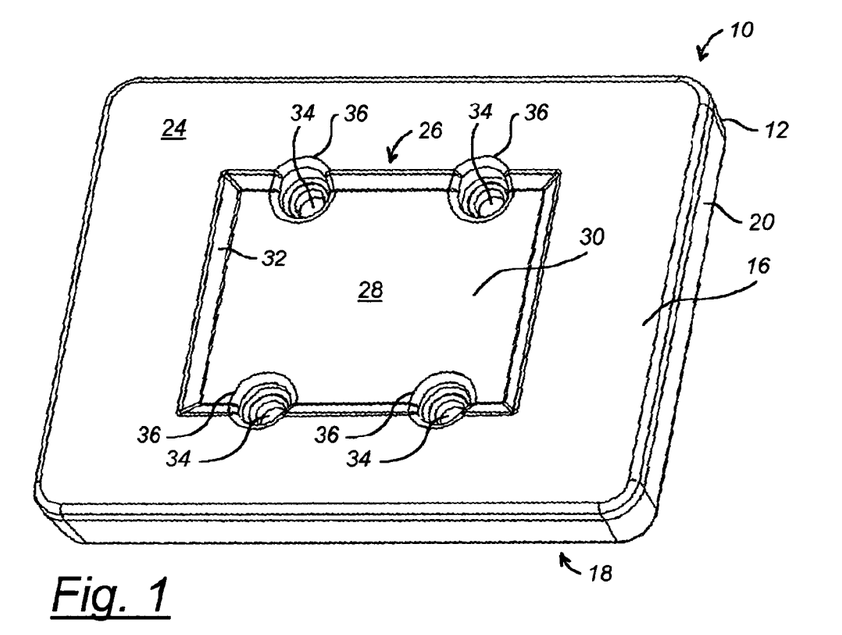
FIG. 1 is a top perspective view that illustrates a magnetic mounting apparatus according to one embodiment of the invention.
Figure 2:
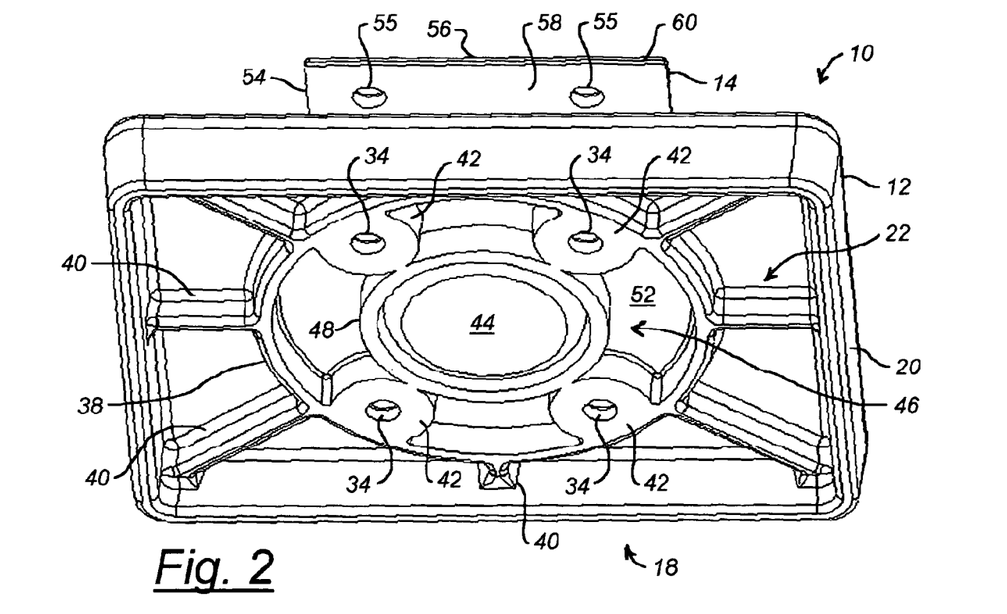
FIG. 2 is a bottom perspective view that illustrates a magnetic mounting apparatus according to one embodiment of the invention.

FIG. 1 is a top perspective view and FIG. 2 is a bottom perspective view that together illustrate a magnetic mounting apparatus 10 according to one embodiment of the invention. The magnetic mounting apparatus 10 of the invention is embodied by example and without limitation as a magnetic mounting platform 12 that operates in combination with a magnetically permeable adapter plate 14 (shown in FIG. 2 and subsequent figures). According to one embodiment of the invention, magnetic mounting platform 12 is formed of an inherently rigid material, such as metal or a hard plastic, and is structured with a generally square or rectangular outline shape and having a thickness that is relatively narrow as compared with the square or rectangular extents, where a square shape is understood to be a specific embodiment of the more general rectangular shape. Thus the magnetic mounting platform 12 includes an upper operational surface 16 and a lower interface surface 18 spaced a relatively short distance apart by a peripheral side wall 20. Alternatively, the magnetic mounting platform 12 is structured with a round, oval, kidney or freeform shapes as are suitable and result in an equivalent structure still having the relatively narrow thickness. According to one embodiment of the invention, the magnetic mounting platform 12 is structured of a solid block of material. However, according to other embodiments of the invention, the lower interface surface 18 is formed with a webbed reinforcing interface structure 22, as illustrated in FIG. 2 and discussed below.

The upper operational surface 16 of the magnetic mounting platform 12 is formed of a generally flat or planar peripheral frame or lip 24 surrounding a shallowly recessed socket 26 of a generally square or rectangular (shown) shape. Alternatively, the recessed socket 26 is structured with a round, oval, kidney or freeform shape that optionally matches the shape of the outline shape of the magnetic mounting platform 12. The recessed socket 26 includes a thin floor 28 formed with a substantially flat or planar support surface 30 that is recessed relative to and substantially parallel with the substantially flat surrounding frame or lip area 24. The recessed socket floor 28 is, for example, on the order of about 0.030 inch thick to about 0.060 inch thick, but is optionally as much as 0.125 inch thick when the magnet or magnets provide a magnetic field that is sufficiently strong to be effective at such a distance. A peripheral transition wall 32 provides an outward transition between the support surface 30 and surrounding frame or lip 24. According to one embodiment of the invention, the peripheral transition wall 32 is substantially perpendicular to the offset surfaces of the support surface 30 and surrounding lip 24. According to an alternative embodiment of the invention, the peripheral transition wall 32 is optionally outwardly inclined between the support surface 30 and surrounding lip 24, thereby providing an inclined transition between the offset surface 30 and surrounding lip 24. For example, when the peripheral transition wall 32 is outwardly inclined it forms an angle in the range of about 30 degrees to 45 degrees from the plane of the support surface 30. However, the angle is optionally in the much larger range of about 15 degrees to as much as 90 degrees from the plane of the support surface 30.

The magnetic mounting platform 12 includes means for securing the assembly 10 to an external mounting surface. Accordingly, by example and without limitation, the magnetic mounting platform 12 is pierced by one or more fastener clearance holes 34 each sized to pass therethrough a mechanical fastener appropriate for attaching the magnetic mounting platform 12 to an external mounting surface such as an intermediate mounting device, as discussed herein. The fastener clearance holes 34 optionally include coincidental annular depressions or recesses 36, either countersinks or counter bores, for recessing the head of a threaded fastener passing therethrough below either of both of the upper operational surface 16 and the recessed support surface 30.

Alternatively, one or more fasteners is optionally integrated with the magnetic mounting platform 12. For example, the heads of two pair of threaded studs are embedded in the molded structure of the magnetic mounting platform 12 with their threaded shafts projecting out of the lower interface surface 18 so as to be inserted through matching apertures in an external mounting surface and secured with nuts. In such instance the fastener clearance holes 34 are filled with the fasteners' threaded shafts. Furthermore, the surfaces of the socket floor 28, i.e., recessed support surface 30, and surrounding lip 24 as well as the peripheral transition wall 32 are optionally left completely unbroken, and the magnetic mounting platform 12 thus presents a substantially solid and unbroken surface.

FIG. 2 is a bottom perspective view of the magnetic mounting apparatus 10 of the invention, including the magnetic mounting platform 12 and the cooperating adapter plate 14. FIG. 2 illustrates the webbed reinforcing interface structure 22 that is provided as part of the lower interface surface 18 of the magnetic mounting platform 12. The frame 24 and recessed support surface 30 are backed by the lower interface surface 18. When relieved on its back surface, the magnetic mounting platform 12 is rigidly reinforced by the reinforcing interface structure 22 that is formed, by example and without limitation, of a rigid central annular ring 38 of rigid material integrally connected to the peripheral side wall 20 by multiple integral rigid radial ribs or stringers 40 and an integral boss 42 backing up each of the one or more fastener clearance holes 34. The rigid central ring 38, the rigid radial stringers 40 and bosses 42 are all integrally formed with the integral frame 24, recessed socket 26 and peripheral side wall 20.

One or more permanent magnets 44 are disposed within a magnet retention structure 46 opposite the support surface 30 of the recessed socket 26. Each of the one or more permanent magnets 44 is, by example and without limitation, a thin round or disk-shape. Although the disk shape is convenient, other magnet shapes are equivalent and maybe substituted. The magnet 44 is of the well-known rare-earth variety. Examples of rare-earth magnets are given in U.S. Pat. No. 6,527,971 entitled, RARE-EARTH BONDED MAGNET, RARE-EARTH BONDED MAGNET COMPOSITION, AND METHOD OF MANUFACTURING THE RARE-EARTH BONDED MAGNET, issued to Nakamura, et al. on Mar. 4, 2003; U.S. Pat. No. 6,527,874 entitled, RARE EARTH MAGNET AND METHOD FOR MAKING THEM IN THEM SAME, issued to Li on Mar. 4, 2003; and U.S. Pat. No. 6,399,150 entitled, RARE EARTH METAL-BASED PERMANENT MAGNET, AND PROCESS FOR PRODUCING THE SAME, issued to Yoshimura, et al. on Jun. 4, 2002, all incorporated herein by reference, as well as many others. Rare-earth magnets are very powerful in proportion to size and are therefore useful in practice of the present invention. However, other known and presently unknown magnets that are sufficiently powerful for practice of the invention are equivalent and may be substituted.

By example and without limitation, the magnet retention structure 46 is embodied as a cavity 48 that positions each of the one or more magnets 44 in close proximity to the flat support surface 30 in a position that is central of the recessed socket 26. According to one embodiment of the invention, the cavity 48 of the magnet retention structure 46 is embodied as a second centrally located rigid annular ring within and substantially concentric with the rigid central ring 38. The rigid annular ring cavity 48 of the magnet retention structure 46 is formed having a floor 50 (shown in FIGS. 3 and 4) that is substantially coplanar with a back surface 52 of the upper operational surface 16 opposite from the planar frame or lip 24 surrounding the recessed socket 26 and the recessed support surface 30 of the socket floor 28. The floor 50 of the annular cavity 48 is spaced away from the socket's recessed support surface 30 only by the minimal thickness of the thin socket floor 28. The centrally located magnet ring cavity 48 is positioned inside the central reinforcing interface structure ring 38 and thereby places the magnet 44 at an approximate center of the floor 28 of the recessed socket 26. The thinness of the socket floor 28 minimizes the distance between the magnet 44 and the socket's recessed support surface 30. Attenuation of the magnetic field generated by the magnet 44 is thereby minimized at the socket's recessed support surface 30 and the magnetic field remains sufficiently powerful to ensure retention of most handheld electronic and other small devices by magnetic attraction to cooperating adapter plate 14.

According to one embodiment of the invention, the centrally located magnet ring cavity 48 of the magnet retention structure 46 is sized to match one of the magnets 44, either as a slip fit or a compression fit such that the magnet 44 is inserted under at least light pressure and as much as a press fit. The magnet 44 is thereby retained in intimate contact with the floor 50 of the magnet ring cavity 48 of the magnet retention structure 46 and in close proximity of the support surface 30. When the magnetic mounting platform 12 is formed of a substantially rigid plastic or other elastomeric material having a property of being resiliently responsive to slight deformations, and the magnet ring cavity 48 is sized as a compression fit for the magnet 44, the magnet 44 is retained by radial compression of the magnet ring cavity 48 which is resiliently deformed by the magnet 44 upon insertion. Therefore, other retention means are avoided such as bi-adhesive tape as taught by both Tarulli in U.S. Pat. No. 5,992,807 and Won in U.S. Pat. No. 6,149,116 or the bayonets in mating apertures as taught by Rielo in U.S. Pat. No. 5,895,018 entitled, MAGNETIC SUPPORT ATTACHMENT, issued Apr. 20, 1999, which is incorporated herein by reference.

The centrally located magnet ring cavity 48 is integrally formed with the integral frame 24, recessed support surface 30 and peripheral side wall 20 of the magnetic mounting platform 12, whereby the magnet ring cavity 48 of the magnet retention structure 46 is included as a part of the webbed reinforcing interface structure 22 provided by one or more embodiments of the lower interface surface 18. According to one embodiment of the invention, each of the rigid bosses 42 is interconnected between the concentric rigid inner magnet ring cavity 48 and outer ring 38 in such manner that the rigid inner and outer rings 48, 38, the bosses 42 and the radial stringers 40 are all integrally interconnected with the peripheral wall 20 of the magnetic mounting platform 12 as well being integral with the back surface 52 of the outer frame 24 and recessed support surface 30 of the upper operational surface 16.

FIG. 2 also illustrates the cooperating adapter plate 14 of the magnetic mounting apparatus 10 embodied as a thin substantially rigid sheet or plate 54 of a ferrous or other highly magnetically permeable ferromagnetic material, such as nickel, cobalt or another ferromagnetic material or alloy. The sheet or plate 54 includes means for substantially permanently attaching the adapter plate 14 to a surface of a handheld device and other small article to be releasably magnetically mounted using the magnetic mounting apparatus 10. According to one embodiment of the invention, the sheet or plate 54 optionally includes one or more fastener clearance holes 55 extended therethrough sized to accept a mechanical fastener, such as a screw or rivet, that is used to fasten the plate 54 to a surface of the device to be magnetically mounted using the magnetic mounting apparatus IO. According to another embodiment of the invention, the sheet or plate 54 is optionally backed with an adhering means 56 for substantially permanently adhering the adapter plate 14 to a surface of a handheld device and other small article to be releasably magnetically mounted using the magnetic mounting apparatus 10. By example and without limitation, the adhering means 56 is a tape or sheet of a bi-adhesive backing material, such as the bi-adhesive tape taught by both Tarulli in U.S. Pat. No. 5,992,807 and Won in U.S. Pat. No. 6,149,116, both incorporated herein by reference. Alternatively, the adhering means 56 is embodied as a resilient adhesive pad of a type commonly known as a Pressure Sensitive Adhesive or PSA. According to another alternative embodiment, the adhering means 56 is embodied as a glue or epoxy that is used to bond the adapter plate 14 to a surface of the handheld device and other small article.

The adapter plate 14 of the magnetic mounting apparatus 10 of the invention is formed of a thin sheet or plate of a rectangular or square shape sized to fit snugly within the socket 26 of the magnetic mounting platform 12 against the recessed support surface 30. The adapter plate 14 is formed having substantially flat opposing mounting and backing surfaces 58 and 60, respectively. When present, the optional one or more fastener clearance holes 55 are extended opposing mounting and backing surfaces 58 and 60. Alternatively, when present, the optional bi-adhesive adhering means 56 is distributed across the adapter plate backing surface 60. During shipping and handling a protective film is provided over the exposed surface of the bi-adhesive adhering means 56 opposite from the adapter plate backing surface 60. The adapter plate 14 is optionally further structured with unidirectionally rounded or beveled peripheral edges 62 inclined outwardly away from the mounting surface 58 toward the opposing backing surface 60. The outwardly inclined edges 62 are matched to the peripheral inclined transition wall 32 between the socket's support surface 30 and the surrounding frame or lip 24 of the magnetic mounting platform 12.

During assembly, the mounting surface 58 of the adapter plate 14 is brought into a substantially parallel relationship with the recessed support surface 30 of the socket 26 and the surrounding lip 24; the adapter plate 14 is rotated relative to the magnetic mounting platform 12 until the adapter plate 14 and socket 24 are relatively aligned, whereupon magnetic attraction between the adapter plate 14 and magnet 44 pulls the adapter plate 14 into the socket 26 with the adapter plate mounting surface 58 in contact with the recessed support surface 30 of the socket 26. During disassembly, the adapter plate 14 is released from the attractive grip of the magnet 44 by twisting the adapter plate 14 relative to the magnetic mounting platform 12. Interference between the edges 62 of the adapter plate 14 and the transition wall 32 between the support surface 30 and surrounding lip 24 forcibly spaces the adapter plate 14 away from the recessed support surface 30 sufficiently far enough to significantly reduce the attraction between the adapter plate 14 and the one or more magnets 44 secured on the other side of the mounting platform support surface 30, and the adapter plate 14 and the device it is attached to are released from the mounting platform 12.

Assembly and disassembly may be made easier by presence of one or both the outwardly inclined transition wall 32 between the recessed support surface 30 and the surrounding lip 24, and the outwardly inclined edges 62 of the adapter plate 14. During assembly, the outwardly inclined edges 62 of the adapter plate 14 cooperate with the outwardly inclined transition wall 32 of the magnetic mounting platform 12 to guide the adapter plate 14 into the socket 26 with its substantially flat mounting surface 58 coextensive with and flush against the socket's substantially flat recessed support surface 30. Furthermore, because the adapter plate 14 is matched in sized and shape to fit snugly within the socket 26, the adapter plate 14 and socket 26 cooperate to resist relative rotational movement when they are configured having matching square, rectangular or other non-round shapes. A handheld device having the adapter plate 14 secured thereto by means of the bi-adhesive adhering means 56 is thereby constrained against rotating or spinning motion relative to the magnetic mounting platform 12.

During disassembly of the adapter plate 14 and handheld device secured thereto, the adapter plate 14 and socket 26 cooperate to release the adapter plate 14 from the attractive grip of the magnet 44 by means of the outwardly inclined edges 62 of the adapter plate 14 traveling along the cooperating outwardly inclined transition wall 32 of the socket 26 when the adapter plate 14 is rotationally twisted relative to the magnetic mounting platform 12. Travel of the adapter plate 14 along the inclined transition wall 32 operates similarly to a threaded joint for lifting the adapter plate 14 to the level of the surrounding frame or lip area 24. The adapter plate 14 is thereby forcibly spaced away from the socket's support surface 30 sufficiently far to significantly attenuate the field of the magnet 44 and thereby significantly reduce the magnetic attraction between the adapter plate 14 and the one or more magnets 44 secured against the surface 52 of the socket floor 28. When the magnetic attraction is thus significantly reduced, the device having the adapter plate 14 secured thereto is easily separable from the magnetic mounting platform 12 portion of the magnetic mounting apparatus 10 of the invention.

Figure 3:
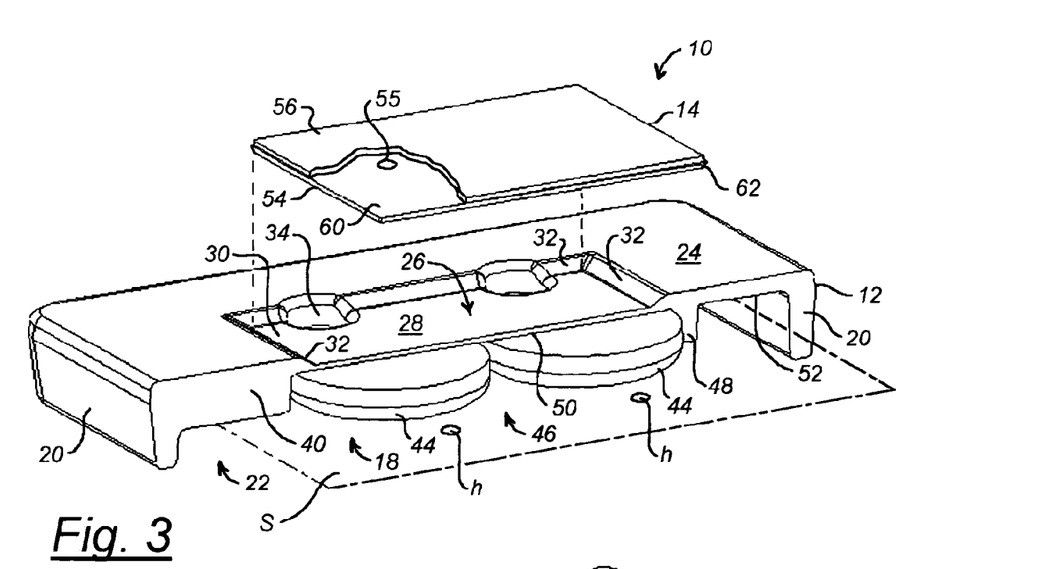
FIG. 3 is a section view taken through the magnetic mounting apparatus of the invention embodied as a two-magnet apparatus with a magnetic mounting platform of the apparatus is secured to an external mounting surface by one or more fasteners in multiple threaded or clearance holes formed therein.

FIG. 3 is a section view taken through the magnetic mounting apparatus 10 of the invention embodied as a two-magnet apparatus with the magnetic mounting platform 12 secured to an external mounting surface "S" by one or more fasteners in threaded or clearance holes "h" formed therein. The section view illustrates the floor 28 of the socket 26 adjacent to the location of each magnet 44 being reduced to a thin membrane that limits attenuation of the field of the magnet 44 to a minimum. The extreme thinness of the socket floor 28 maximizes the magnetic attraction of the adapter plate 14 so that the handheld device having the adapter plate 14 secured thereto is securely retained by the magnetic mounting platform 12.

According to one embodiment of the invention, the reinforcing structure of the interface surface 18 also operates as means for capturing and securing the magnet 44 between the floor 50 of the magnet ring cavity 48 and the external mounting surface S upon which the magnetic mounting platform 12 is mounted in practice. Accordingly, the rigid inner magnet ring cavity 48 of the magnet retention structure 46 is sized relative to the magnet 44 such that the magnet 44 is captured between the floor 50 on the back surface 52 of the recessed socket 26 and the external mounting surface so that the magnet 44 is constrained in close proximity of the recessed socket support surface 30. Therefore, according to one embodiment of the invention, the components of the interface surface reinforcing structure: the rigid inner magnet ring cavity 48, the rigid outer ring 38, the bosses 42 and the radial stringers 40, are all sized to be substantially coplanar with the thickness of the magnet 44 being substantially the same as the depth of the magnet ring cavity 48. As such, the external mounting surface S upon which the magnetic mounting platform 12 is mounted operates as a backstop to retain the magnets 44 within the magnet retention structure 46 when the magnet ring cavity 48 is sized as a slip fit for the magnet 44, as discussed herein. Accordingly, even when the magnet 44 is a slip fit in the magnet ring cavity 48, the magnet retention structure 46 effectively avoids the other retention means as taught by the prior art.

Figure 4:
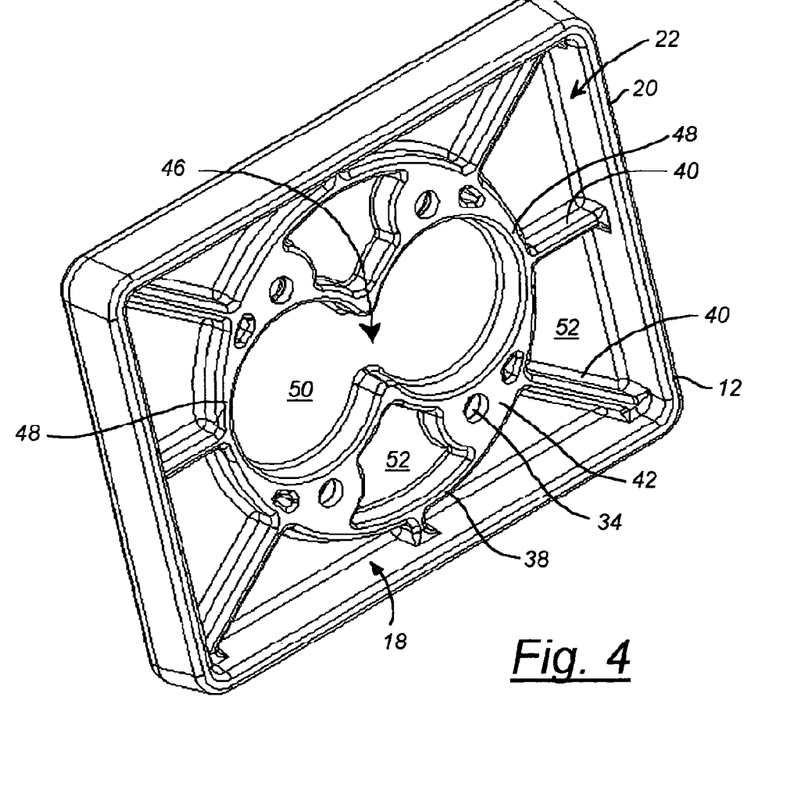
FIG. 4 is a bottom perspective view that illustrates one embodiment of the magnetic mounting platform that is useful when the magnetic mounting apparatus of the invention is embodied as a dual-magnet apparatus.

FIG. 4 is a bottom perspective view that illustrates one embodiment of the magnetic mounting platform 12 useful when the magnetic mounting apparatus 10 of the invention is embodied as a two-magnet apparatus. Accordingly, the exemplary embodiment of the magnetic mounting platform 12 includes the magnet retention structure 46 embodied with the cavity 48 being embodied by an overlapping pair of the rigid annular ring cavities 48 each sized as either as a slip fit or a compression fit for one of the magnet 44. The annular ring cavities 48 are positioned within the reinforcing interface structure ring 38 and thereby place the pair of magnets 44 at an approximate center of the floor 28 of the recessed socket 26. The floors 50 of the two overlapping annular ring cavities 48 are spaced away from the socket floor 28 of the recessed support surface 30 by only the thin membrane that forms the minimal thickness of the thin socket floor 28. The magnets 44 are therefore positioned in close proximity of the socket's recessed support surface 30 so that attenuation of the magnetic field is minimized.

Figure 5:
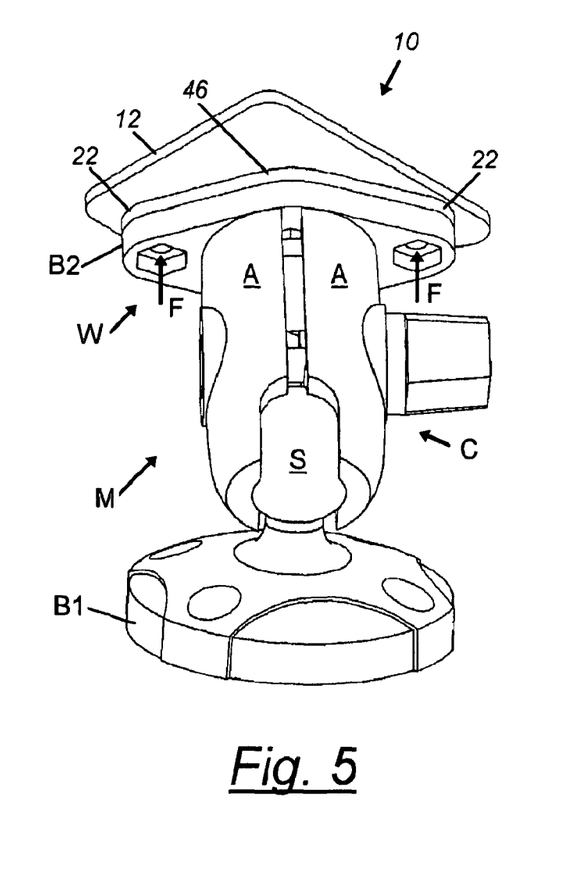
FIG. 5 is a bottom perspective view that illustrates the magnetic mounting apparatus of the invention as installed on the external mounting surface of an exemplary universally positionable mounting device of a type known in the prior art.

FIG. 5 is a bottom perspective view that illustrates the magnetic mounting apparatus 10 of the invention as installed on the external mounting surface S of an exemplary universally positionable mounting device (designated "M") of a type known in the prior art. Such universally positionable mounting devices typically include a base "B1" structured for mounting on any surface such as an automobile or airplane dashboard or in the cockpit of a marine vessel. One such universal mounting device includes by example and without limitation a resiliently compressible spherical ball "B" and a and mating split-arm socket assembly "A-A" with a clamping element "C" for securing the ball and socket structure in a desired arrangement. A positively positionable wheel-and-axle structure "W" is rotatable relative to the split-arm assembly A-A. The wheel-and-axle structure W is mounted on a second base "B2" that is structured to mate with the interface structure 22 of the magnetic mounting apparatus 10 and simultaneously cover the magnet retention structure 46. The base B2 thereby captures the magnet 44 within the magnet retention structure 46 when fasteners "F" are installed between the base B2 and each of the fastener clearance holes 34 in the interface structure 22 to secure the magnetic mounting platform 12. Mounting of the magnetic mounting apparatus 10 to the base B2 of the universal mounting device M thus provides a universally positionable magnetic mounting platform while simultaneously further eliminating the additional or auxiliary magnet retention means required by the prior art magnetic mounting platforms. An example of such a universally positionable mounting device M is disclosed by Carnevali in U.S. Pat. No. 6,561,476, entitled "POSITIVELY-POSITIONABLE MOUNTING APPARATUS," the complete disclosure of which is incorporated herein by reference.

Figure 6:
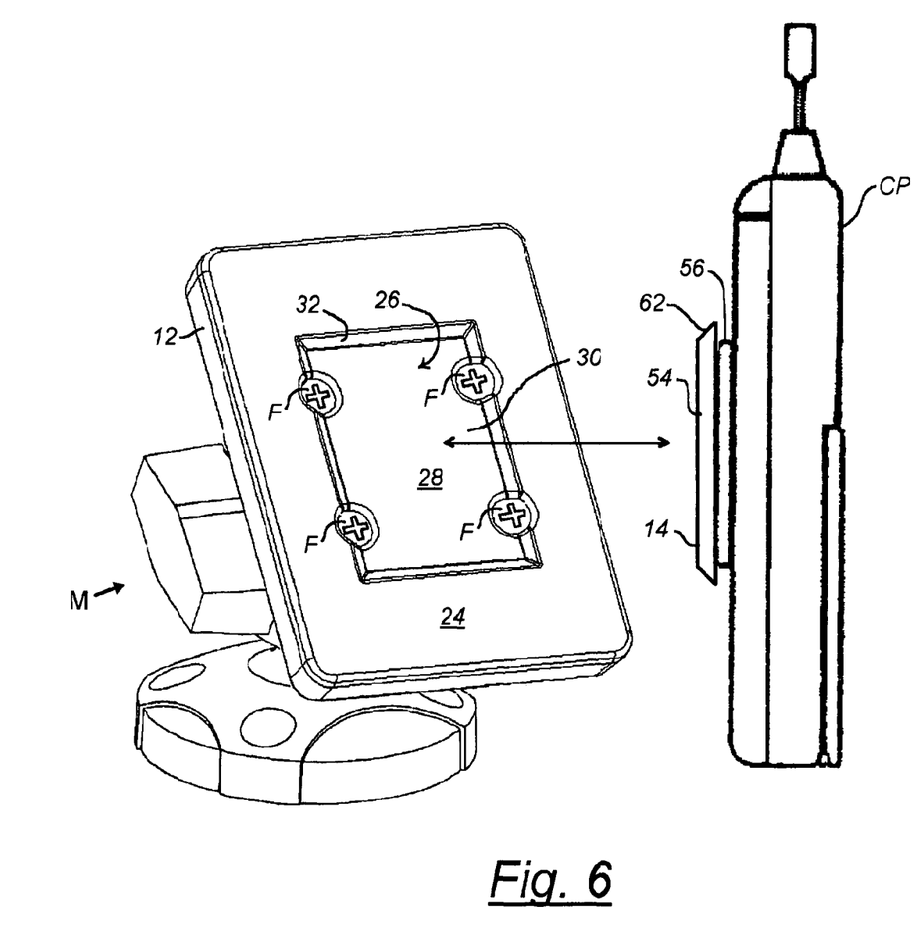
FIG. 6 is a top perspective view that illustrates the magnetic mounting apparatus of the invention in combination with a universally positionable mounting device of the type described in FIG. 5.

FIG. 6 is a top perspective view that illustrates the magnetic mounting apparatus 10 of the invention in combination with a universally positionable mounting device M of the type described in FIG. 5. As illustrated in FIG. 6, the magnetic mounting platform 12 is coupled to the universally positionable mounting device M by one or more fasteners F that are passed through the one or more clearance holes 34 and secured to the second base B2. When the optional recesses 36 are present, the fasteners F are recessed below the recessed support surface 30 to avoid interference with the adapter plate 14 by which an external cellular phone (designated "CP") or other handheld device is removably retained by proximity to the magnet 44.

The rectangular hole pattern embodiment of the interface structure 22 illustrated is suitable for mounting using the two-hole pattern of the diamond patterned second base B2, as disclosed in previously incorporated U.S. Pat. No. 6,561, 476. Accordingly, the magnetic mounting platform 12 is secured to the second base B2 using only two fasteners F.

FIG. 6 also illustrates installation of the magnetically permeable adapter plate 14 on one surface of an external handheld device shown as the cellular phone CP. The bi-adhesive adhering means 56 securely fixes the backing surface 58 of the adapter plate 14 to an external surface of the cellular phone CP, such as the back of the cellular phone.

Figure 7:
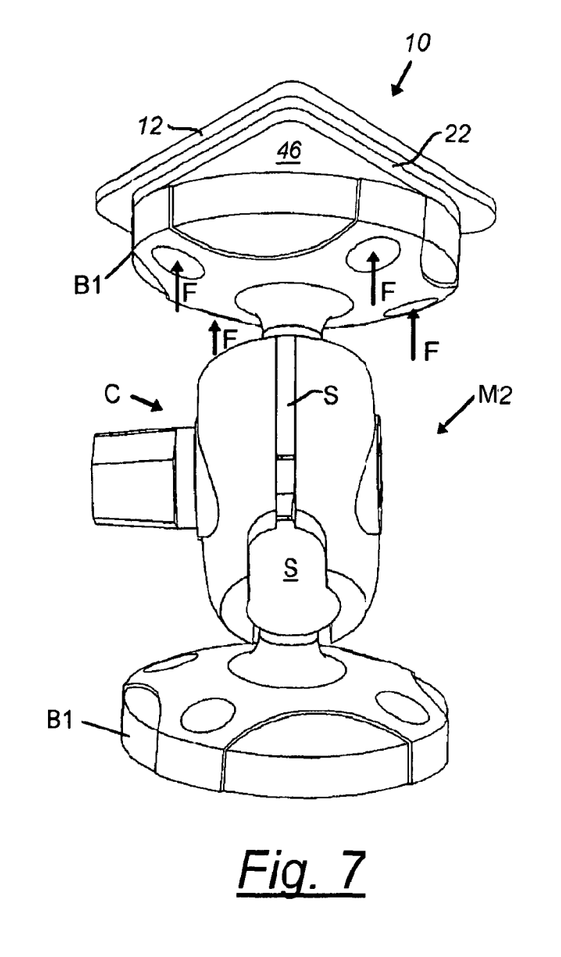
FIG. 7 is a bottom perspective view that illustrates the magnetic mounting apparatus of the invention as installed on the external mounting surface of another exemplary universally positionable mounting device of a type known also in the prior art.

FIG. 7 is a bottom perspective view that illustrates the magnetic mounting apparatus 10 of the invention as installed on the external mounting surface S of another exemplary universally positionable mounting device (designated "M2") of a type known also in the prior art. The rectangular hole pattern embodiment of the interface structure 22 illustrated is suitable for mounting the resiliently compressible ball-shaped coupler described in U.S. Pat. No. 5,845,885, entitled UNIVERSALLY POSITIONABLE MOUNTING DEVICE, issued Dec. 8, 1998, which is incorporated herein by reference.

While the rectangular hole pattern embodiment of the interface structure 22 illustrated is not intended to be exhaustive and is shown as only one example and without limitation, the interface structure 22 is suitable for mounting on a second base B1 having the resiliently compressible ball-shaped coupler described in previously incorporated U.S. Pat. No. 5,845,885. Accordingly, the mounting device M2 includes two such resiliently compressible ball-shaped couplers secured in the mating split-arm socket assembly A-A by the clamping element C.

Other alternative embodiments of the interface structure 22 are also contemplated for mounting to a variety of different useful mounting devices.

While the preferred embodiment of the invention has been illustrated and described, it will be appreciated that various changes can be made therein without departing from the spirit and scope of the invention.

What is claimed is:

1. A magnetic mounting apparatus, comprising:
   (a) a magnetic mounting platform, comprising:
      an operational surface that is formed with a peripheral lip portion substantially surrounding a socket having a support surface that is recessed relative to the lip portion,
      a magnet retention structure projecting from a backing surface opposite from the recessed support surface of the socket and being structured for retaining a magnet in close proximity thereto,
      an interface surface projecting from the backing surface, the interface surface being structured for securing the mounting platform to an external mounting surface with the recessed support surface of the socket facing away from the external mounting surface and for retaining a magnet within the magnet retention structure between the backing surface and the external mounting surface, and
      a magnet retained within the magnet retention structure; and
   (b) an adapter plate formed of a magnetically permeable material and structured to cooperate with the socket.

2. The apparatus of claim 1, further comprising an inclined transition surface formed between the recessed support surface and the peripheral lip portion.

3. The apparatus of claim 1 wherein the magnetic mounting platform further comprises a rigid platform formed of substantially rigid material.

4. The apparatus of claim 1 wherein the magnet retention structure further comprises a cavity that is sized to compressively retain the magnet.

5. The apparatus of claim 4 wherein the magnet retention structure further comprises an annular ring sized to accept the magnet under at least a light pressure.

6. The apparatus of claim 1 wherein the magnet further comprises a rare-earth type permanent magnet.

7. The apparatus of claim 1, further comprising one or more apertures extending between the operational surface and interface surface, each of the one or more apertures being structured to accept a fastener.

8. The apparatus of claim 1, further comprising a bi-adhesive material disposed on one surface of the plate.

9. The apparatus of claim 1, further comprising one or more fastener clearance holes formed through the plate.

10. A magnetic mounting apparatus, comprising:
    a rigid mounting platform having a substantially planar recessed support surface formed within a peripheral lip portion;
    a disk-shaped permanent magnet;
    a magnet retention structure projecting from a backing surface opposite from the recessed support surface, the magnet retention structure being structured for retaining the magnet in close proximity to the recessed support surface;
    an interface structure projecting from the backing surface of the mounting platform, the interface structure being structured for securing the mounting platform to an external mounting surface with the recessed support surface facing away from the external mounting surface and for capturing the magnet within the magnet retention structure between the backing surface and the external mounting surface; and
    a portion of magnetically attractive material distinct from the mounting platform, the portion of magnetically attractive material being sized to mate with the recessed support surface within the peripheral lip portion and having an adhesive material disposed thereon for adhering to a surface of an external device to be supported.

11. The apparatus of claim 10 wherein the portion of magnetically attractive material further comprises one or more fastener clearance holes extended therethrough, each fastener clearance hole being sized to accept a mechanical fastener therethrough for attachment to a surface of an external device to be supported.

12. The apparatus of claim 10 wherein the magnet retention structure further comprises an annular ring sized to accept the magnet thereinto under at least light pressure.

13. The apparatus of claim 10 wherein the interface structure further comprises a plurality of bosses distributed around the magnet retention structure.

14. The apparatus of claim 10 wherein the mounting platform further comprises an outwardly inclined transition wall between the recessed support surface and peripheral lip portion.

15. The apparatus of claim 10 wherein the portion of magnetically attractive material and the recessed support surface further comprise mutually cooperating substantially rectangular shapes.

16. The apparatus of claim 14 wherein the portion of magnetically attractive material further comprises an outwardly inclined peripheral edge.

* * * * *

UNITED STATES PATENT AND TRADEMARK OFFICE
CERTIFICATE OF CORRECTION

| | | |
|---|---|---|
| PATENT NO. | : 7,374,142 B2 | Page 1 of 1 |
| APPLICATION NO. | : 10/883309 | |
| DATED | : May 20, 2008 | |
| INVENTOR(S) | : Jeffrey D. Carnevali | |

It is certified that error appears in the above-identified patent and that said Letters Patent is hereby corrected as shown below:

Title Page, item (57) in the ABSTRACT beginning at page 1, column 2, please replace the Abstract with the following amended paragraph:

Abstract

An apparatus for removably retaining by magnetic attraction any of various modern handheld devices. The magnetic mounting apparatus provides a magnetic mounting platform having a socket-like recessed support surface surrounded by a raised lip and backed by an interface structure that secures the magnetic mounting platform assembly to an external mounting surface. A permanent magnet is disposed within a cavity that positions magnet in close proximity to the flat support surface. A separate and distinct ferromagnetic adapter plate is adhered to a device to be supported, the adapter plate being structured for accommodation by the socket-like recessed support surface for removably retaining the device by magnetic attraction to the magnetic mounting platform.

Signed and Sealed this
Twelfth Day of May, 2015

Michelle K. Lee
*Director of the United States Patent and Trademark Office*